US009141902B2

(12) United States Patent
Pueschner et al.

(10) Patent No.: US 9,141,902 B2
(45) Date of Patent: Sep. 22, 2015

(54) SMART CARD MODULE FOR A SMART CARD

(71) Applicant: Infineon Technologies AG, Neubiberg (DE)

(72) Inventors: Frank Pueschner, Kelheim (DE); Kristof Bothe, Regensburg (DE); Juergen Hoegerl, Regensburg (DE); Andreas Karl, Tegernheim (DE); Andreas Mueller-Hipper, Regensburg (DE); Peter Scherl, Regensburg (DE); Peter Stampka, Burglengenfeld (DE); Uwe Wagner, Bad Abbach (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 243 days.

(21) Appl. No.: 13/631,929

(22) Filed: Sep. 29, 2012

(65) Prior Publication Data

US 2013/0082112 A1 Apr. 4, 2013

(30) Foreign Application Priority Data

Sep. 29, 2011 (DE) .......................... 10 2011 115 315

(51) Int. Cl.
*G06K 19/02* (2006.01)
*G06K 19/077* (2006.01)
(52) U.S. Cl.
CPC ................ *G06K 19/07747* (2013.01)

(58) Field of Classification Search
USPC .......................... 235/488, 492, 451; 361/737
See application file for complete search history.

(56) References Cited

U.S. PATENT DOCUMENTS

| 6,166,911 | A  | * | 12/2000 | Usami et al. ................... 361/737 |
| 6,440,773 | B1 | * | 8/2002 | Usami ........................... 438/107 |
| 6,607,135 | B1 | * | 8/2003 | Hirai et al. ..................... 235/487 |
| 6,677,186 | B1 | * | 1/2004 | Zafrany et al. ................ 438/125 |
| 8,410,592 | B2 |   | 4/2013 | Otremba et al. |
| 2008/0087913 | A1 |   | 4/2008 | Otremba et al. |
| 2008/0205012 | A1 |   | 8/2008 | Heinemann et al. |

FOREIGN PATENT DOCUMENTS

| DE | 200 21 698 U1 | 4/2001 |
| DE | 20021698 U1 | 5/2001 |
| DE | 199 54 941 A1 | 6/2001 |
| DE | 19954941 A1 | 6/2001 |
| DE | 10 2006 047 761 A1 | 4/2008 |
| DE | 102006047761 A1 | 4/2008 |
| DE | 10 2006 060 719 A1 | 6/2008 |
| WO | 0137338 A1 | 5/2001 |

* cited by examiner

*Primary Examiner* — Ahshik Kim

(57) ABSTRACT

A smart card module for a smart card, comprising a chip having electrical contacts at a front side; a first laminate layer, wherein a rear side of the chip is connected to the first laminate layer, the rear side of the chip opposite the front side; a second laminate layer; a first conductive layer, wherein the electrical contacts of the chip are connected to the first conductive layer and the first conductive layer is arranged between the chip and the second laminate layer; and an adhesive material arranged between the chip and the conductive layer and/or the second laminate layer.

11 Claims, 2 Drawing Sheets

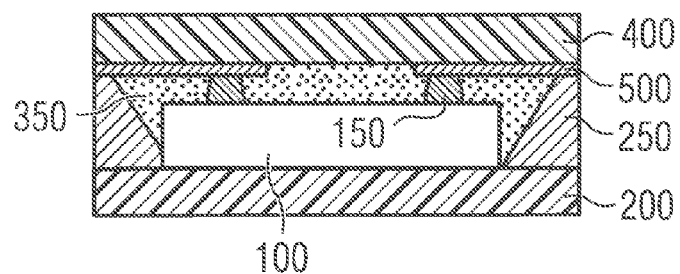
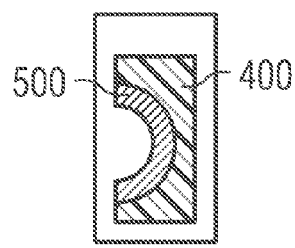
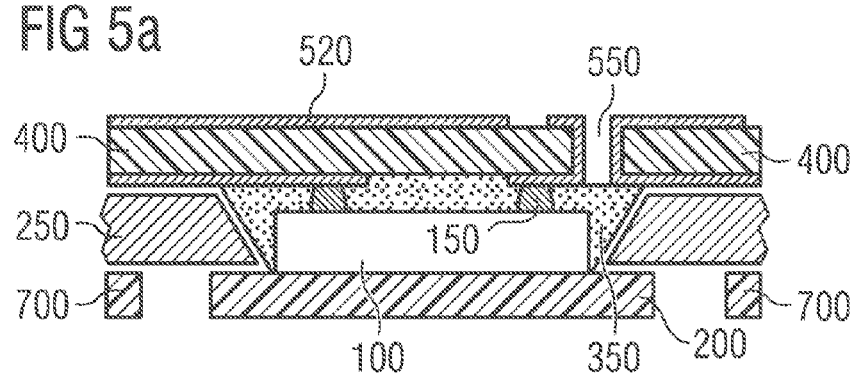
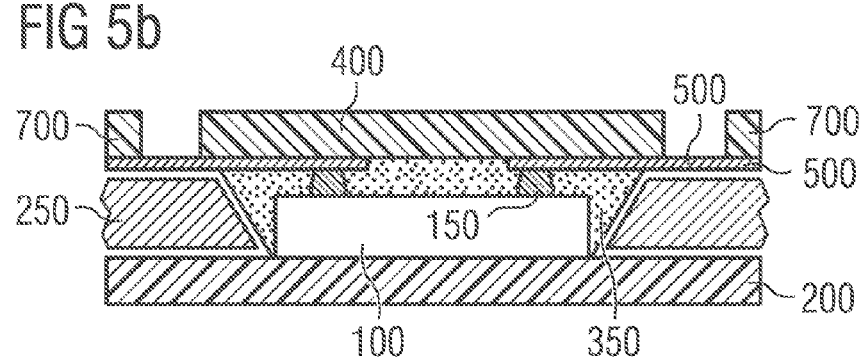

SMART CARD MODULE FOR A SMART CARD

This application claims priority to German Patent Application No. 10 2011 115 315.6, which was filed Sep. 29, 2011, and is incorporated herein by reference.

TECHNICAL FIELD

The present invention relates to a smart card module for smart cards.

BACKGROUND

The invention is generally concerned with the very large scale integration of electronic elements or of circuits integrated in a housing, or of electronic modules, which are designated as "smart card module" in the present invention.

In many areas of electronics, sensor technology and microsystems engineering, the production requirements exert pressure that drives increasing miniaturization and increasing productivity by combining subsystems in more highly integrated structures. The trend toward ever more highly integrated and more compact designs that can also be used directly in smart cards already leads to the use of components that are arranged directly in modules. Such modules are, for example, the contactless modules of the known design series MCC, MOB or MOA. In these modules, the chip is contact-connected by means of so-called wire bonds and enveloped by a plastic enclosure (mold). Owing to the dictates of construction, this type of integration leads to a large total thickness of the module and thereby makes integration into a smart card more difficult.

Furthermore, contactless smart card modules are known, such as the MFCC1 module, for example. In the MFCC1, the chip is contact-connected by means of NiAu contacts using so-called flip-chip mounting. In flip-chip mounting, the chip is mounted with the active contact-connecting side facing downward directly toward the substrate or circuit carrier. As a result, a covering of the chip is no longer necessary. Consequently, the total thickness of the smart card module is principally determined by the chip thickness. However, such a contactless smart card module is highly susceptible to mechanical loading and has low flexural stiffness on account of the small chip thickness.

A method designated as frame adhesive bonding is likewise known. The desired stabilization or stiffening of the module is intended to be ensured by means of this method. In frame adhesive bonding, a frame is adhesively bonded onto the leadframe before further processing. However, this requires an adhesive that directly influences the total thickness of the module. Typical frame heights are 300 μm, and so module constructions of the required thickness cannot be realized. Furthermore, there is the risk here of delamination between frame and leadframe.

SUMMARY OF THE INVENTION

In one aspect, the present invention provides a smart card module which is thin but nevertheless robust and cost-effective to produce.

A smart card module for a smart card comprises a first laminate layer, a chip having electrical contacts, and a first conductive layer, wherein the electrical contacts of the chip are connected to the conductive layer and the conductive layer is arranged between the chip and the first laminate layer, and wherein the smart card module furthermore comprises an adhesive means wherein the adhesive means is arranged between the chip and the conductive layer and/or the first laminate layer. By virtue of the fact that the chip is arranged in the smart card module in this way, a particularly thin and nevertheless robust design of a smart card module is ensured. Furthermore, a high robustness and flexural stiffness of the smart card module is thereby ensured and thin smart card modules having total thicknesses of <200 μm can be realized.

In a further embodiment, the smart card module for a smart card can comprise adhesive means, which adhesive means extend beyond the lateral edges of the chip.

In one embodiment, the smart card module for a smart card can furthermore comprise an encapsulation compound arranged at the lateral edges of the chip.

In one embodiment, the smart card module for a smart card can comprise a further, second laminate layer, wherein a rear side of the chip is connected to the second laminate layer.

In one embodiment, the smart card module for a smart card can comprise a further, second conductive layer, and the second conductive layer can be arranged on the opposite side of the second laminate layer relative to the first conductive layer.

In one embodiment of the smart card module for a smart card, the first conductive layer and the second conductive layer can be electrically conductively connected by means of vias. This affords the advantage that the smart card module can be electrically contact-connected from both sides.

In a further embodiment, the first and/or the second conductive layer(s) of the smart card module for a smart card can be embodied as electrical contact areas.

In one embodiment of the smart card module, the first and the second conductive layers can be embodied in such a way that the smart card module comprises lateral contact areas at the narrower sides of the smart card module.

In one embodiment, the smart card module can comprise side webs arranged laterally at the first and/or the second laminate layer. A design of the smart card module that is even more robust and/or has even higher flexural stiffness can be ensured by means of the side webs.

In a further embodiment, the first and the second conductive layers of the smart card module can comprise metal.

In a further embodiment of the smart card module for a smart card, the laminate layers can comprise synthetic resin.

BRIEF DESCRIPTION OF THE DRAWINGS

The more complete understanding of the present invention, and the advantages thereof, reference is now made to the following descriptions taken in conjunction with the accompanying drawing, in which:

FIG. 1 shows a second conductive layer, which is separated from the first conductive layer by means of a second laminate layer, wherein the first conductive layer and the second conductive layer are connected by means of vias;

FIG. 4a schematically shows a smart card module with a possible embodiment of an electrical lateral contact-connection of the smart card module;

FIG. 4b shows a partial excerpt in plan view of the lateral edge of a smart card module; and FIGS. 5a and 5b show two embodiments of a smart card module with optional lateral webs.

Exemplary embodiments of the invention are explained in greater detail below, with reference to the accompanying figures. However, the invention is not restricted to the embodiments specifically described, but rather can be modified and altered in a suitable manner. It lies within the scope of the invention to suitably combine individual features and feature combinations of one embodiment with features and feature combinations of another embodiment, in order to arrive at further embodiments according to the invention.

Before the exemplary embodiments of the present invention are explained in greater detail below with reference to the figures, it is pointed out that identical elements in the figures are provided with the same or similar reference signs and that a repeated description of these elements is omitted. Furthermore, the figures are not necessarily true to scale. Rather, the main emphasis is on elucidating the basic principle.

DETAILED DESCRIPTION OF ILLUSTRATIVE EMBODIMENTS

Figure 1:
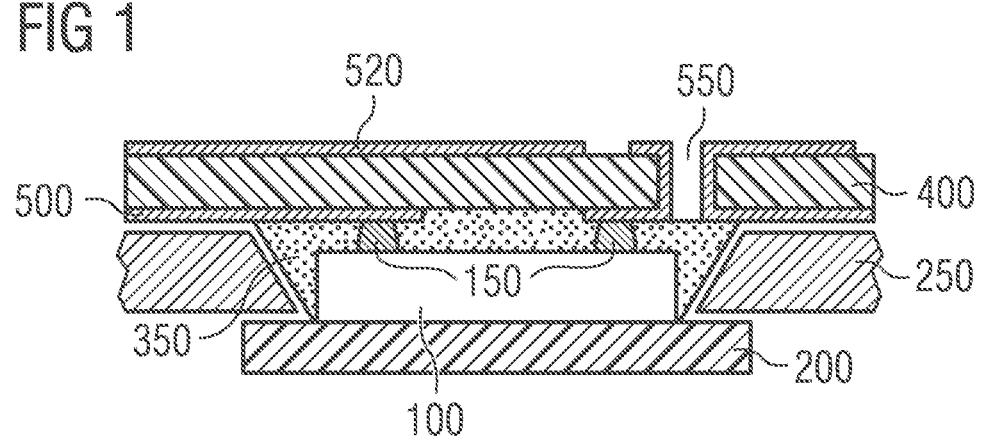
FIG. 1 schematically shows a smart card module comprising a first laminate layer, a chip having electrical contacts and a first conductive layer, wherein the electrical contacts of the chip are connected to the conductive layer. Furthermore.

FIG. 1 shows a smart card module comprising a first laminate layer 200 and a chip 100. The laminate layer 200 can be embodied as a monolayer since it can have just a single layer. The chip 100 can advantageously be connected to the laminate layer 200 by means of ultrasound or by means of an adhesive or by means of lamination. The chip 100 furthermore comprises electrical contacts 150 connected to a conductive layer 500. By means of the conductive layer 500, the chip 100 can thus be contact-connected externally. A second laminate layer 400 can be applied on the conductive layer 500. Laminate layers can comprise, in particular, materials such as FR4 or BT. The second laminate layer 400 can furthermore have a further conductive layer 520, which is arranged on the opposite side relative to the first conductive layer. The two conductive layers 500, 520 can be conductively connected by means of vias 550. As a result, the smart card module can be contact-connected externally in an easily accessible manner and diversely. The chip 100 can additionally be arranged such that it is completely or else only partly enveloped in an adhesive material 350, preferably an adhesive, underfill or mold. This arrangement ensures a particularly good strength of the smart card module. In addition, the smart card module can comprise one or more laminations 250 arranged laterally on the chip. Alternatively, instead of the laminate, it is also possible to use encapsulation layers or else a combination of lamination and encapsulation. The laminations can comprise, for example, RCC, prepreg, resin, mold, adhesive, etc. Particularly robust smart card modules that are expedient to produce can be realized by means of the stated construction.

Figure 2:
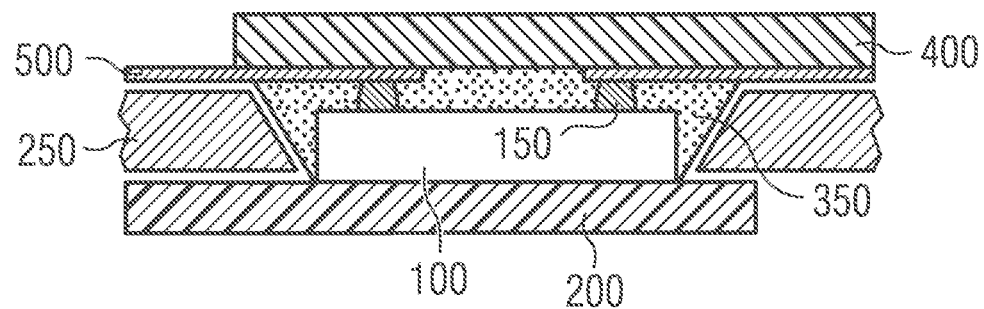
FIG. 2 schematically shows a smart card module comprising a first laminate layer, a chip having electrical contacts and a first conductive layer, wherein the electrical contacts of the chip are connected to the first conductive layer. Furthermore, a second laminate layer is applied on the conductive layer, and at least partly covers the conductive layer.

FIG. 2, like FIG. 1, shows a smart card module comprising a first laminate layer 200 and a chip 100. The laminate layer 200 can be embodied as a monolayer since it can have just a single layer. The chip 100 can advantageously be connected to the laminate layer 200 by means of ultrasound or by means of an adhesive or by means of lamination. The chip 100 furthermore comprises electrical contacts 150 connected to a conductive layer 500. By means of the conductive layer 500, the chip 100 can thus be contact-connected externally. A second laminate layer 400 can be applied on the conductive layer 500. In all embodiments, the second laminate layer can also be embodied as a PCB (printed circuit board). Laminate layers can comprise, in particular, materials such as FR4 or BT. In this embodiment, too, the chip 100 can be arranged such that it is completely or else only partly enveloped in an adhesive material 350, preferably an adhesive, underfill or mold. This arrangement ensures a particularly good strength of the smart card module. In addition, the smart card module can comprise one or more laminations 250 arranged laterally on the chip. Alternatively, instead of the laminate, it is also possible to use encapsulation layers or else a combination of lamination and encapsulation. The laminations can preferably comprise RCC, prepreg, resin, mold, adhesive, etc. Particularly robust smart card modules that are expedient to produce can be realized by means of the stated construction.

Figure 3:
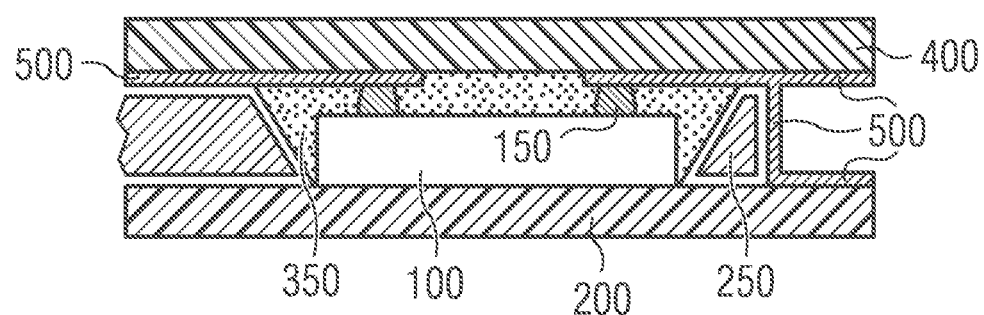
FIG. 3 schematically shows a smart card module comprising the features of FIG. 2, but a laminate layer is applied on the conductive layer and completely covers the conductive layer.

FIG. 3 shows a smart card module in accordance with the embodiments described in FIGS. 1 and 2. In addition, the smart card module in this embodiment additionally comprises conductive layers 500 which are arranged at least at one of the narrow sides and which can be embodied as electrical contacts and which can furthermore be embodied in such a way that they can easily be contact-connected externally. The conductive layers are connected to the electrical contacts 150 of the chip 100. An additional robustness and strength of the smart card module is achieved by means of the lateral arrangement of the electrical layers on the smart card module.

FIG. 4a shows in principle, a smart card module as already described in the previous FIGS. 1-3. In addition, the smart card module comprises geometrical shapes of the laminate layer 400 and of the electrical layers 500 that are arranged at at least one of the narrow sides of the smart card module. FIG. 4b shows one possible embodiment of the geometrical shapes.

FIGS. 5a and 5b show further embodiments of a smart card module. The smart card module can comprise the feature combinations of the embodiments in the figures already described previously. Furthermore, FIGS. 5a and 5b comprise optional side webs 700, which additionally increase the stability and strength of the smart card module. The side webs 700, like the laminate layer 200, can preferably comprise RCC, prepreg, resin, mold, adhesive, etc. The side webs 700 can be arranged laterally with respect to the first laminate layer 200 or else laterally with respect to the second laminate layer 400. The side webs 700 can be arranged and fixed on the conductive layer 500. The side webs 700 can also be arranged laterally with respect to the laminate layer 200 and advantageously fixed by means of laminations 250 arranged laterally on the chip.

What is claimed is:

1. A smart card module for a smart card, comprising:
a chip having electrical contacts at a front side;
a first laminate layer, wherein a rear side of the chip is connected to the first laminate layer, the rear side of the chip opposite the front side;
a second laminate layer;
a first conductive layer, wherein the electrical contacts of the chip are connected to the first conductive layer and the first conductive layer is arranged between the chip and the second laminate layer;
an adhesive material arranged between the chip and the conductive layer and/or the second laminate layer;

further comprising a second conductive layer, wherein the second conductive layer is arranged on the opposite side of the second laminate layer relative to the first conductive layer; and wherein the first conductive layer and the second conductive layer are electrically conductively connected by vias.

2. The smart card module as claimed in claim 1, wherein the adhesive material extends beyond lateral edges of the chip.

3. The smart card module as claimed in claim 1, further comprising an encapsulation compound arranged at lateral edges of the chip.

4. The smart card module as claimed in claim 1, wherein the first conductive layer and/or the second conductive layer are/is embodied as electrical contact areas.

5. The smart card module as claimed in claim 1, wherein the first conductive layer and/or the second conductive layer are/is embodied in such a way that the smart card module has lateral contact areas at narrower sides of the smart card module.

6. The smart card module as claimed in claim 1, wherein the smart card module comprises side webs arranged laterally at the first and/or second laminate layer.

7. The smart card module as claimed in claim 1, wherein the first conductive layer and/or the second conductive layer comprise(s) metal.

8. The smart card module as claimed in claim 1, wherein the first laminate layer and/or the second laminate layer comprise(s) synthetic resin.

9. The smart card module as claimed in claim 2, wherein the encapsulation compound comprises synthetic resin.

10. A smart card comprising:
a smart card module, comprising:
a chip having electrical contacts at a front side;
a first laminate layer, wherein a rear side of the chip is connected to the first laminate layer, the rear side of the chip opposite the front side;
a second laminate layer;
a first conductive layer, wherein the electrical contacts of the chip are connected to the first conductive layer and the first conductive layer is arranged between the chip and the second laminate layer;
an adhesive material arranged between the chip and the conductive layer and/or the second laminate layer;
further comprising a second conductive layer, wherein the second conductive layer is arranged on the opposite side of the second laminate layer relative to the first conductive layer; and
wherein the first conductive layer and the second conductive layer are electrically conductively connected by vias.

11. A method for producing a smart card module, the method comprising:
providing a chip having electrical contacts at a front side;
providing a first laminate layer, wherein a rear side of the chip is connected to the first laminate layer, the rear side of the chip opposite the front side;
providing a second laminate layer;
providing a first conductive layer, wherein the electrical contacts of the chip are connected to the first conductive layer and the first conductive layer is arranged between the chip and the second laminate layer; and
providing an adhesive material, wherein the adhesive material is arranged between the chip and the first conductive layer and/or the second laminate layer;
providing a second conductive layer, wherein the second conductive layer is arranged on the opposite side of the second laminate layer relative to the first conductive layer; and
connecting electrically the first conductive layer and the second conductive layer by vias.

\* \* \* \* \*